United States Patent [19]

Ochoa Gomez et al.

[11] Patent Number: 5,319,037
[45] Date of Patent: Jun. 7, 1994

[54] PROCESS FOR OBTAINING A HYDROXY-ENDED GLYCIDIL AZINE POLYMER

[75] Inventors: Jose R. Ochoa Gomez, Madrid; Felipe Serna Arenas, Burgos; Jose M. C. Pelayo, Castresana Bilao, all of Spain

[73] Assignee: Ercros S.A., Barcelona, Spain

[21] Appl. No.: 922,624

[22] Filed: Jul. 30, 1992

[30] Foreign Application Priority Data

Aug. 1, 1991 [ES] Spain ................................. 9101804

[51] Int. Cl.$^5$ .................. C08K 5/28; C08G 65/32; C08G 65/24
[52] U.S. Cl. .................................. 525/403; 552/11
[58] Field of Search ........................... 552/11; 525/403

[56] References Cited

U.S. PATENT DOCUMENTS

| | | | |
|---|---|---|---|
| 4,268,450 | 5/1981 | Frankel | 525/410 |
| 4,405,762 | 9/1983 | Earl | 525/410 |
| 4,937,361 | 6/1990 | Wagner | 552/11 |
| 5,130,381 | 7/1992 | Ahad | 525/403 |

*Primary Examiner*—John C. Bleutge
*Assistant Examiner*—D. R. Wilson
*Attorney, Agent, or Firm*—Ladas & Parry

[57] ABSTRACT

A process for obtaining a hydroxy-ended glycidyl azide polymer (GAP). The process consists in reacting polyepichlorohydrin (PECH) with a metallic azide in the presence of an organic solvent having a parameter of solubility comprised between 21 and 23.5 (MPa)$^{\frac{1}{2}}$ such as DMA or NMP. The use of any of the solvents mentioned sharply reduces the reaction time needed for substituting azide groups for the chlorine present in the PECH. Said reaction times can be less than 4 hours when NMP is used or less than 6 hours when DMA is used. The GAP thus obtained having a functionality equal to or above 2 can be used as energetic bonding agent in the formulation of solid propellants for rockets.

7 Claims, No Drawings

PROCESS FOR OBTAINING A HYDROXY-ENDED GLYCIDIL AZINE POLYMER

SCOPE OF THE INVENTION

The invention concerns a substantially improved process for synthesizing a hydroxy-ended glycidyl aside polymer (GAP) by reacting polyepichlorohydrin (PECH) of adequate characteristics and a metallic azide in a polar organic solvent having a parameter of solubility comprised between 21 and 23.5 (MPa)$^{\frac{1}{2}}$, preferably between 22 and 23, such as dimethyl acetamide (DMA) or N-methyl-pyrrolidine (NMP) at temperatures above 90° C. The use of solvents that meet said condition and in particular DMA or NMP allows a sharp reduction of the reaction time needed to complete the reaction.

PRIOR ART

The hydroxy-ended glycidyl azide polymers (GAP) are utilizable as energetic bonding agents in the formulation of solid propellants for rockets. Their energetic power stems from the energy associated with the carbon-azide (C—$N_3$) bond. Each one of said bonds lends 85 Kcal/mole of energy to the system. On the other hand, their usefulness in said application is due to the fact that the polymer must be hydroxy-ended and the functionality thereof (no. of OH/molecule groups) must be equal to or more than 2.

In the patent literature there have been described, for obtaining GAP from PECH and a metallic azide, three processes which differ from each other only by the reaction solvent used. In the three cases the times of reaction needed to obtain a degree of substitution (of the C—$N_3$ bond for the C—Cl bond) above 90% are very long, generally on the order of 40 hours.

Thus, in Australian patent AU-A-60799/86 the GAP is synthesized in dimethyl sulfoxide (DMSO). Even though no yields are mentioned in said patent, the time of reaction described is more than 25 hours.

In U.S. Pat. No. 4,486,351, polyethylene glycol (PEG) is used as solvent. The time of reaction is comprised between 25 and 50 hours depending on the molecular weight of the PEG used. It is mentioned in this patent that a 100% of substitution degree is obtained only with PEG 400 and 40 hours are needed for that. Even so there is obtained a relatively low yield of 63.5%.

In U.S. Pat. No. 4,268,450, the synthesis is carried out in dimethyl formamide (DMF). After 72 hours of reaction the degree of substitution was 90% and the yield 73%. It is claimed in this patent that the synthesis can be carried out in any polar organic solvent. However, as will be shown herebelow, this is not always true. High yields and degrees of substitution within times of reaction of less than 7 hours are obtained only with those organic solvents having a parameter of solubility comprised between 21 and 23.5 (MPa)$^{\frac{1}{2}}$, preferably between 22 and 23.

As it has been said above, the main disadvantage of the processes known already for obtaining GAP from PECH can be summarized as follows:
i) long times of reaction (generally more than 40 hours) are required to obtain a high degree of substitution; and
ii) moderate yields (generally comprised between 63.5 and 73%) are obtained.

Therefore, one object of this invention is a process for synthesizing GAP from PECH with a functionality equal to or above 2 which overcomes the above mentioned disadvantages and allows a sharp reduction in the time of reaction and the obtention of an end product (GAP) with high yield and high degree of substitution.

DETAILED DESCRIPTION OF THE INVENTION

The GAP is obtained by reaction of polyepichlorohydrin (PECH) with a metallic azide in a suitable solvent at temperatures above 90° C. according to the following reaction diagram:

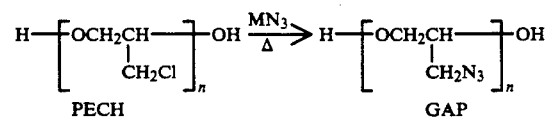

wherein n is an integer comprised between 5 and 43.

The metallic azide ($MN_3$) used is generally sodium azide ($NaN_3$). The reaction is carried out in heterogeneous phase, since the azide is practically insoluble in organic solvents. Consequently, the selection of the solvent is of primary importance for obtaining both an adequate speed of reaction and a high yield.

All the solvents hitherto used result in reaction times longer than 25 hours regardless of their polarity (defined by their dipolar moment $\mu$) However, according to the process of this invention, the use of organic solvents having a parameter of solubility comprised between 21 and 23.5 MPa)$^{\frac{1}{2}}$, preferably between 22 and 23, results in a sharp reduction of the reaction time needed to obtain a GAP with high yields and degrees of substitution. In fact, using NMP (parameter of solubility 22.9) there are obtained degrees of substitution above 92% in 3.5 hours and using DMA (parameter of solubility 22.7) there are obtained degrees of substitution above 92% after 5.5 hours. However, the yield obtained is higher when using DMA which, together with its easier recovery, makes of DMA the preferred solvent for carrying out the process of this invention.

To obtain the above mentioned results, it is required that the reaction temperature be approximately 90° C. inasmuch as lower temperatures substantially delay the reaction while temperatures above 120° C. may cause a partial degradation of the GAP. Consequently, the process of this invention can preferably be carried out at temperatures comprised between 95° C. and 105° C. The functionality of the starting PECH must be equal to or above 2 and its molecular weight may be comprised between 500 (n=5) and 4000 (n=43).

However, to obtain a GAP having adequate properties for use in the formulation of rocket propellants, it is necessary that the molecular weight of the PECH be on the order of 2000 (n≈21-22). The concentration of PECH in the medium can be comprised between 2% and 50% by weight (referred to the soluble reactants, that is, PECH and solvent), preferably between 20% and 30%.

The molar ratio of sodium azide to glycidyl chloride groups in the PECH can be comprised between 1 and 2 the best results being obtained for a ratio of 1.1.

Once the reaction is terminated, the solid (NaCl in case $NaN_3$ is used) is filtered and the solvent (DMA or NMP) is recovered by distillation. The residues of the solvent and NaCl are extracted with water after dissolving the GAP in dichloromethane (DCM). After decanting the organic phase, it is dried with Na$_2$SO$_4$ or MgSO$_4$, filtered, and the DCM is recovered by distillation. The residue is pure GAP which is a viscous liquid of a color varying from amber to red. The examples that follow illustrate the invention without limiting it. In all of them the starting material has been a PECH having the following characteristics:

Mw: 2030 (average molecular weight in weight)
Mn: 1550 (average molecular weight in no.)
Functionality: 2.1

EXAMPLE 1

In a reaction vessel are mixed 20 g PECH (0.216 moles), 21 g NaN$_3$ (0.324 moles) and 120 ml DMA. The mixture is heated at 95° C. for 5.5 hours while mechanically stirring.

The degree of conversion was followed by IR after the disappearance of the band at 740 cm (typical of the C-Cl. bond). After the reaction was terminated (5.5 hours), the solid was filtered and the DMA recovered by vacuum distillation. To the residue were added 200 ml DCM and it was extracted with water (4×200 ml). After decanting the organic phase it was dried with MgSO$_4$, filtered, and the DCM was eliminated by distillation.

There was obtained a reddish residue of 19.4 g which constituted the GAP. The yield was 90.5% and the degree of substitution, determined by elemental analysis, was 92%.

The end product (GAP) obtained had the following characteristics:

Mw: 2300
Mn: 1780
Elemental analysis: (C36.9); H(5.1); N(39) % by weight.

EXAMPLE 2

The process described in Example 1 was repeated, but substituting NMP for the DMA. The reaction was deemed terminated after 3.5 hours.

The yield obtained was 83% and the degree of substitution 95%.

Characteristics of the GAP obtained:
Mw: 2350
Mn: 1800
Elemental analysis: C(36.7); H(5.2); N(39.9) % by weight.

EXAMPLE 3

The process of Example 1 was repeated, but using a concentration of PECH of 26% by weight and adequately modifying the amount of sodium azide added so that the molar ratio of sodium azide to glycidyl chloride groups in the PECH was that of Example 1 (1.5).

The yield obtained was 86% and the degree of substitution 94.5%. The molecular weights and elemental analysis of the GAP obtained were like in Example 2.

EXAMPLE 4

The process of Example 1 was repeated, but using 15.5 g NaN$_3$ whereby the molar ratio of sodium azide to glycidyl chloride groups in the PECH was 1.1. The yield obtained was 95% and the degree of substitution 94%. The molecular weights and elemental analysis of the GAP obtained were like in the preceding Example.

EXAMPLE 5

The process of Example 1 was repeated, but carried out at a temperature of 80° C.

The yield obtained was 95% and the degree of substitution 64%.

The GAP obtained had the following characteristics:
Mw: 2150
Mn: 1650
Elemental analysis: C(37.3); H(5.2); N(27.1) % by weight.

The functionality of the GAP obtained in Examples 1 to 5 is between 2 and 2.3.

EXAMPLE 6

In a reaction vessel of 5 kg there are mixed 1 kg PECH, 3 kg DMA and 0.824 kg sodium azide. They are heated at 95° C. and kept under vigorous stirring for 5.5 hours. After isolating the GAP obtained, following a sequence of operations similar to the one described in Example 1, there was obtained 1.04 kg of a viscous liquid of reddish color the analysis of which by IR shows that it is GAP.

The yield obtained was 94.5% and the degree of substitution determined by elemental analysis was 92%. Other characteristics of the GAP obtained are summarized herebelow:

Mw = 2179
Mn = 1600
[OH] = 1.14 meg/g
Functionality = 2.4.

The DMA was recovered by vacuum distillation with a yield of 95% and a purity of more than 99%.

EXAMPLES 7 to 14

A series of experiments were performed in order to show that the speed of reaction, the yield and the degree of substitution are not related to the polarity of the organic solvent (defined by the dipolar moment thereof) and that only in those having a parameter of solubility ($\delta$) between 21 and 23.5 (MPa)$^{\frac{1}{2}}$, preferably between 22 and 23, is it possible to obtain a GAP with high yields and degrees of substitution within short times of reaction.

In all these examples the work was carried out with a PECH concentration of a molar ratio of sodium azide to glycidyl chloride groups in the PECH and at a temperature of 95° C., except in Example 7 (T=66° C.) and Example 8 (T=72° C.).

The results relative to the yield and degree of substitution obtained are shown on table 1 where have also been included the results obtained in Examples 1 and 2 (with DMA and NMP respectively).

TABLE 1

Synthesis of GAP. PECH = 14% p/p.
Molar ratio of sodium azide to glycidyl chloride groups = 1.5
T = 95° C. except in
Examples 7 (T = 66° C.) and 8 (T = 72° C.).

| EXAMPLE | SOLVENT | $\mu^1$ | $\delta^2$ | tr | Y% | S% |
|---|---|---|---|---|---|---|
| 7 | THF | 1.75 | 19.4 | 1h | 18 | — |
| 8 | MEX | 2.76 | 19 | 30 | 55 | — |
| 9 | SULFOLANE | 4.81 | 27 | 23 | 87.5 | 66.5 |
| 10 | NMP/H$_2$O 75/25 | 3.53 | 29.1 | 7 | 74.4 | 66.5 |
| 11 | NMF | 3.86 | 28.9 | 7.5 | 90 | 72 |
| 12 | DMSO$^{(3)}$ | 3.90 | 26.6 | 25 | — | — |
| 13 | DMF/H$_2$O 80/20 | 3.46 | 29.4 | 82 | 72 | 91 |

TABLE 1-continued

Synthesis of GAP. PECH = 14% p/p.
Molar ratio of sodium azide to glycidyl chloride groups = 1.5
T = 95° C. except in
Examples 7 (T = 66° C.) and 8 (T = 72° C.).

| EXAMPLE | SOLVENT | $\mu^1$ | $\delta^2$ | tr | Y% | S% |
|---|---|---|---|---|---|---|
| 14 | DMF[4] | 3.86 | 24.8 | 72 | 73 | 96 |
| 1 | DMA | 3.72 | 22.7 | 5.5 | 90.5 | 92 |
| 2 | NMP | 4.09 | 22.9 | 3.5 | 83 | 95 |

[1] Dipolar moment (debyes)
[2] Parameter of solubility of the solvent $(MPa)^{\frac{1}{2}}$
[3] Australian patent AU-A-60977/86
[4] U.S. Pat. No. 4,268,450
tr = time of reaction (hours)
Y = yield (%)
S = degree of substitution (%)

Analyzing table 1 it is observed that:

i) the yields obtained using tetrahydrofuran (THF) and methyl ethyl ketone (MEK), Examples 7 and 8, were very low and therefore the degree of substitution was not determined;

ii) using sulfolane, one of the most polar solvents existing ($\mu$=4.81 debyes), the degree of substitution obtained was of only 66.5% after 23 hours of reaction. Its parameter of solubility was 37 $(MPa)^{\frac{1}{2}}$;

iii) using NMP (Example 2), a degree of substitution of 95% was obtained after 3.5 hours of reaction. But when adding 25% water to the NMP (Example 10), the degree of substitution was only 56.5% after 7 hours of reaction. The yield likewise diminished by 9 points, there being obtained only 74.4%;

iv) using DMF (Example 14), moderate yields (73%) and elevated degrees of substitution (96%) can be obtained after 72 hours of reaction. Comparing DMF with DMA, it is noted that the polarity of DMF is somewhat higher than in DMA ($\mu$=3.86 in DMF and $\mu$=3.72 in DMA) but the parameter of solubility ($\delta$) of DMF is higher by 2.1 units than in DMA and above the critical value (23.5) established in this invention, which means that to obtain the elevated degree of substitution cited (96%) very long times of reaction (72 hours) must be used, which results in moderate yields (73%). On the other hand, using DMA, degrees of substitution of 92% and yields on the order of 90.5% are obtained after 5.5 hours;

v) DMSO (a highly polar solvent, $\mu$=3.90) likewise has an elevated parameter of solubility (26.6) which makes it necessary to work with long times of reaction for obtaining interesting results (Example 12);

vi) using N-methylformamide (NMF), a solvent related to the DMF (identical dipolar moment and belonging to the same chemical family), there are obtained poor results that are shown on table 1 owing to the fact that the NMF has an elevated parameter of solubility ($\delta$=28.9); and finally vii) using DMF with 20% water added (Example 13) it is observed that good degrees of substitution are obtained, but after very long times of reaction (82 hours), since the parameter of solubility of the DMF/H$_2$O mixture is 29.4 $(MPa)^{\frac{1}{2}}$.

Therefore, as it has been sufficiently demonstrated, for obtaining GAP with high yields and degrees of substitution, not all polar solvents are adequate, and only those meeting the condition that their parameter of solubility be comprised between 21 and 23.5 $(MPa)^{\frac{1}{2}}$, preferably between 22 and 23, result in good yields and high degrees of substitution after short times of reaction (less than 7 hours).

Having described the object of this invention, it is declared that the essence thereof is stated in the following.

We claim:

1. A process for the preparation of hydroxy-terminated glycidyl azide polymer with a hydroxyl-functionability of 2 or above, said process consisting essentially of mixing a first reactant consisting of polyepichlorohydrin with a second reactant consisting of sodium azide in a polar organic solvent having a solubility parameter between 21 and 23.5 $(MPa)^{\frac{1}{2}}$ at a temperature between about 90° and 105° C. whereby to cause a reaction between said reactants which results in formation of said hydroxy-terminated glycidyl azide polymer, said reactants and said solvent being present in amounts such that the molar ratio of sodium azide to glycidyl chloride groups in the polyepichlorohydrin is between 1 and 2, that the concentration of polyepichlorohydrin in the solvent is between 2 and 50 weight %, and reaction between said reactants proceeds to completion within a period of less than 6 hours.

2. The process as claimed in claim 1 wherein the organic solvent has a solubility parameter between 22 and 23 $(MPa)^{\frac{1}{2}}$.

3. The process as claimed in claim 1 wherein the organic solvent is dimethyl acetamide or N-methyl pyrrolidine.

4. The process as claimed in claim 1 wherein the organic solvent is dimethyl acetamide.

5. The process as claimed in claim 1 wherein the reaction results in a yield of hydroxy-terminated glycidyl azide polymer of at least about 83%.

6. The process as claimed in claim 5 wherein the organic solvent is N-methyl pyrrolidine and the reaction proceeds to completion in less than 4 hours.

7. The process as claimed in claim 5 wherein the molar ratio of sodium azide to glycidyl chloride groups is about 1.1.

* * * * *

UNITED STATES PATENT AND TRADEMARK OFFICE
CERTIFICATE OF CORRECTION

PATENT NO. : 5,319,037
DATED : June 7, 1994
INVENTOR(S) : Ochoa GOMEZ, et al

It is certified that error appears in the above-indentified patent and that said Letters Patent is hereby corrected as shown below:

Title page at [54] and col. 1, line 2,

Change "AZINE" to --AZIDE--

Signed and Sealed this

Twenty-eight Day of March, 1995

Attest:

BRUCE LEHMAN

Attesting Officer     Commissioner of Patents and Trademarks